(12) United States Patent
Lee

(10) Patent No.: US 8,655,406 B2
(45) Date of Patent: Feb. 18, 2014

(54) CALL CONNECTING APPARATUS OF MOBILE COMMUNICATION TERMINAL

(75) Inventor: Gunsoo Lee, Yongin-si (KR)

(73) Assignee: Gunsoo Lee, Yongin-si, Gyeonggi-do (KR)

(*) Notice: Subject to any disclaimer, the term of this patent is extended or adjusted under 35 U.S.C. 154(b) by 0 days.

(21) Appl. No.: 13/413,911

(22) Filed: Mar. 7, 2012

(65) Prior Publication Data
US 2013/0122957 A1 May 16, 2013

(30) Foreign Application Priority Data
Nov. 16, 2011 (KR) .................. 10-2011-0119278

(51) Int. Cl.
*H04W 88/00* (2009.01)
*H04M 1/00* (2006.01)

(52) U.S. Cl.
USPC ...................................... 455/556.1

(58) Field of Classification Search
USPC ............ 455/556.1, 404.1; 345/156, 173, 158; 715/716, 863
See application file for complete search history.

(56) References Cited

U.S. PATENT DOCUMENTS

| | | | |
|---|---|---|---|
| 2005/0233766 A1* | 10/2005 | Futami .................... | 455/556.1 |
| 2009/0303176 A1* | 12/2009 | Chen et al. ................. | 345/156 |
| 2009/0316005 A1* | 12/2009 | Ito ............................ | 348/207.1 |
| 2012/0295661 A1* | 11/2012 | Kim et al. ................. | 455/556.1 |

* cited by examiner

*Primary Examiner* — Meless N Zewdu
*Assistant Examiner* — Jean Chang
(74) *Attorney, Agent, or Firm* — Sherr & Jiang, PLLC

(57) ABSTRACT

In the call connecting apparatus, when receiving the call, an angle signal, a speed signal, a count signal or a direction signal of a user' motion is generated from image signals collected by a camera unit. If the value of the generated signal is equal to the angle, the speed, the count or the direction which is set previously, the call is stopped or connected.

1 Claim, 3 Drawing Sheets

CALL CONNECTING APPARATUS OF MOBILE COMMUNICATION TERMINAL

CROSS REFERENCE TO PRIOR APPLICATIONS

The present application claims priority under 35 U.S.C. §119 to Korean Patent Application No. 10-2011-0119278 (filed on Nov. 16, 2011), which is hereby incorporated by reference in its entirety.

BACKGROUND OF THE INVENTION (1) Field of the Invention

The present invention relates to a call connecting apparatus of a mobile communication terminal such as a smart phone, which is capable of stopping or connecting a call with motion information such as user's movement and without pressing keys or buttons or touching screen when receiving the call.

(2) Description of the Related Arts

Generally, a mobile communication terminal is a portable communication system that allows a user to communicate speech or image data through a terminal anywhere.

In a mobile communication terminal, the terminal is a user terminal and is often called a cellular phone. The first mobile communication system is an analog type cellular phone capable of transmitting and receiving only speech signals. Recently various terminals are released, which capable of bundling video, text message, internet, broadcasting, photographing, mobile payment and so on.

The most recent one of the terminals is a smart phone. The smart phone is a high performance mobile communication terminal which is able to provide various functions such as a program execution, a data communication, a PC interworking and so on.

Moreover, the smart phone is a complex wireless communication product in which mobile phone functions are combined with merits of a personal digital assistant (PDA). That is, by adding PDA functions to mobile phone functions, the smart phone is able to communicate speech, interwork with PC, manage personal information, access wireless internet, and transmit and receive facsimile.

The basic usage of the smart phone is similar to a general mobile phone. However, the smart phone provides a keypad input and a digital pen input solution, so that users can use it more easily.

Most of smart phones have a touch screen such as a liquid crystal display (LCD) and a user can input instructions or information to smart phone by the touch screen. Frequently, the touch screen may be activated by the user's careless or unconscious touches, so that an undesired call may be connected or an undesired function may be executed.

To solve above problem, some smart phones have a locking function to disable the touch screen. And the locking or releasing of the smart phone is performed by touching on the touch screen, according to a series of touch sequence. However, the touch sequence is complex and needs to touch the smart phone. Therefore, while driving or working with two hands, it is difficult that the user releases the locking function or connects a call.

SUMMARY OF THE INVENTION

The present invention has been developed to solve the problems with above-described smart phone.

It is an object of the present invention to provide a call connecting apparatus of a mobile communication terminal such as a smart phone, which is capable of stopping or connecting a call with motion information such as user's movement and without pressing keys or buttons or touching screen when receiving the call.

In accomplishing the above objectives, a call connecting apparatus 100 of a mobile communication terminal 1 according to the present invention connects a call with motion information when receiving the call. The apparatus 100 includes a communication module 2 provided to the mobile communication terminal 1, wherein the communication module 2 transmits and receives a wire/wireless communication signal; a camera unit 20 provided to the mobile communication terminal 1, wherein the camera unit 20 collects the images of the user's shaking or turning motions, converts them to digital image signals, and outputs an angle signal, a speed signal, a count signal or a direction signal; and a control unit 30 for outputting an operation signal to the camera unit 20 when the communication module 2 receives a call, and outputting a control signal corresponding to a user's motion from a motion/control table set and stored previously when a signal connected with the user's motion is inputted from the camera unit 20, thereby stopping or connecting the call.

The call connecting apparatus according to the present invention can stops or connects a call with motion information such as user's movement and without pressing keys or buttons or touching screen when receiving the call, so that the user can use it more easily while driving or working with two hands.

Further, the call connecting apparatus according to the present invention can connect to a call only if the user is a registered user, so that the user's privacy is guaranteed and the communication security is improved.

DETAILED DESCRIPTION OF THE EMBODIMENTS

Referring now attaching the drawings, a call connecting apparatus of a mobile communication terminal according to an embodiment of the present invention will be described in detail.

Figure 1:
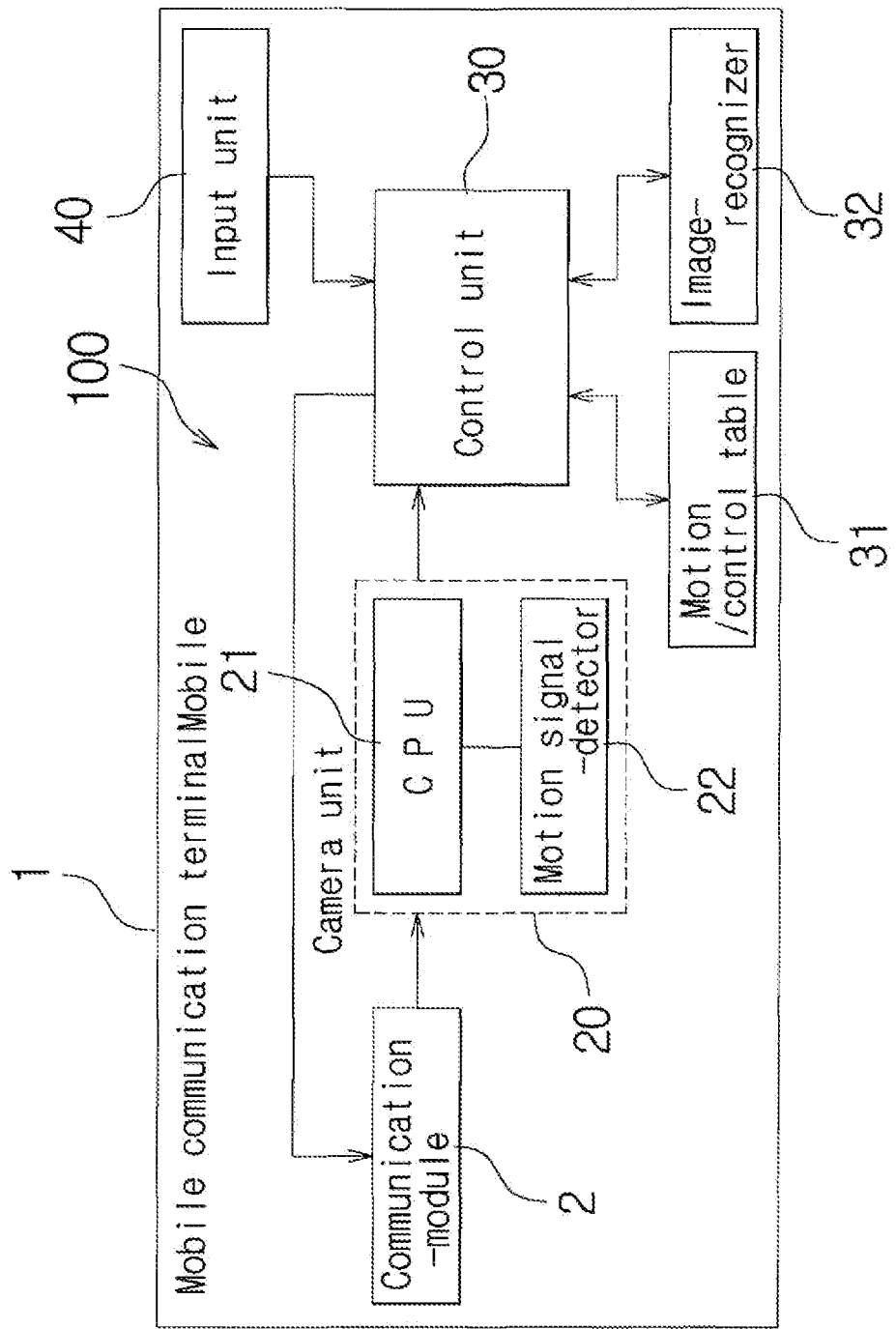
FIG. 1 is a block diagram showing the hardware structure of an apparatus according to the present invention.

First, a hardware structure according to an embodiment of the present invention is shown in FIG. 1.

As shown FIG. 1, the call connecting apparatus 100 of the mobile communication terminal 1 collects motion information when receiving a call. When receiving the call, an angle signal, a speed signal, a count signal or a direction signal of a user' motion is generated from image signals collected by a camera unit 20. If the value of the generated signal is equal to the angle, the speed, the count or the direction which is set previously, the call is stopped or connected.

More concretely, the call connecting apparatus 100 of the mobile communication terminal 1 comprises a communication module 2 provided to the mobile communication terminal 1, a camera unit 20 provided to the mobile communication terminal 1, and a control unit 30.

The communication module 2 transmits and receives a wire/wireless communication signal. The camera unit 20 collects the images of the user's shaking or turning motions, converts them to digital image signals, and outputs an angle signal, a speed signal, a count signal or a direction signal. The control unit 30 outputs an operation signal to the camera unit 20 when the communication module 2 receives a call, and outputs a control signal corresponding to a user's motion from a motion/control table set and stored previously when a signal connected with the user's motion is inputted from the camera unit 20, thereby stopping or connecting the call.

The call connecting apparatus according to an embodiment of the present invention further comprises an input unit 40 for selecting a screen/button input mode or a motion input mode, or setting and storing a motion/control table 31.

The communication module 2 may be a 3G communication device based on digital mobile phone system having a frequency band of 2 GHz according to the IMT 2000 standard of International Telecommunication Union, or a 4G communication device having a frequency band of 50 Mbps-1 Gbps which has been defined as a communication standard by World Radio Conference.

The camera unit 20 is a camera having hundreds of thousands to millions of pixels. The camera unit 20 comprises a CPU 21 for converting analog data inputted from an image sensor to a digital image signal, and a motion signal detector 22 for extracting an angle signal, a speed signal, a count signal or a direction signal of user's motion from the digital image signal. The image sensor may be a solid state image sensing device for sensing image.

The control unit 30 may be a microprocessor having a logic circuit in which a program is loaded. According to the program, the control unit 30 outputs an operation signal to the camera unit 20 when the communication module 2 receives a call. Further, according to the program, when a detection signal of a user's motion is inputted from the camera unit 20, the control unit 30 outputs a control signal corresponding to the user's motion from a motion/control table 31 set and stored previously, thereby stopping or connecting the call.

The control unit 30 further comprises an image recognizer 32. The image recognizer 32 converts a user image signal filmed and inputted previously by the camera 20 to a digital signal and stores it. And, the image recognizer 32 compares the stored image signal with the user image signal automatically filmed and inputted after receiving the call, and determines whether the user of the filmed image is a registered user of the mobile communication terminal 1.

The image recognizer 32 may be a process in which a program or an algorithm is loaded. According to the program, the process receives a face image filmed by the camera unit 20, searches the contour of the face, extracts specific points such as the distance between eyes, the size of eye, etc, matches the face with the existing image, and thereby discriminating the face.

The motion/control table 31 may be a signal value of a control operation, which is set and stored previously and adopted according to the user's motion filmed by the camera unit 20.

An example of the motion/control table 31 will be described hereinafter.

First, in case of the motion/control table 31 related to an angle, the motion signal detector 32 extracts the inclination angle value being changed as the user moves to right or left and forward or backward. In this case of the control table, the call is stopped if the inclination angle value is less than 0-30 degree, and the call is connected if the inclination angle value is equal or more than 30 degree and less than 90 degree.

Next, in case of the motion/control table 31 related to a speed, the motion signal detector 32 detects the speed value being changed as the user moves to right or left and forward or backward. In this case of the control table, the call is stopped if the speed value is less than 3 cm/sec, and the call is connected if the speed value is equal or more than 3 cm/sec.

Next, in case of the motion/control table 31 related to a count, the motion signal detector 32 counts the number of times that the user moves to right or left and forward or backward. In this case of the control table, the call is stopped if the count value is less than 2, and the call is connected if the count value is more than 2.

Next, in case of the motion/control table 31 related to a direction, the motion signal detector 32 detects the direction that the user moves to right or left and forward or backward. In this case of the control table, the call is stopped if the direction is right or backward (corresponding to negative value), and the call is connected if the direction is left or forward (corresponding to positive value).

The motion/control table 31 may be differently adopted according to the condition set and stored previously.

Further, the input unit 40 may be a button input means which outputs an operation signal corresponding to the inputted button. The button may be a button formed on a display screen or a mechanical button.

As described above, each component of the present invention is provided with operating power from a battery of the mobile communication terminal 1.

Hereinafter, the operation of the call connecting apparatus according to an embodiment of the present invention is described.

Figure 2A:
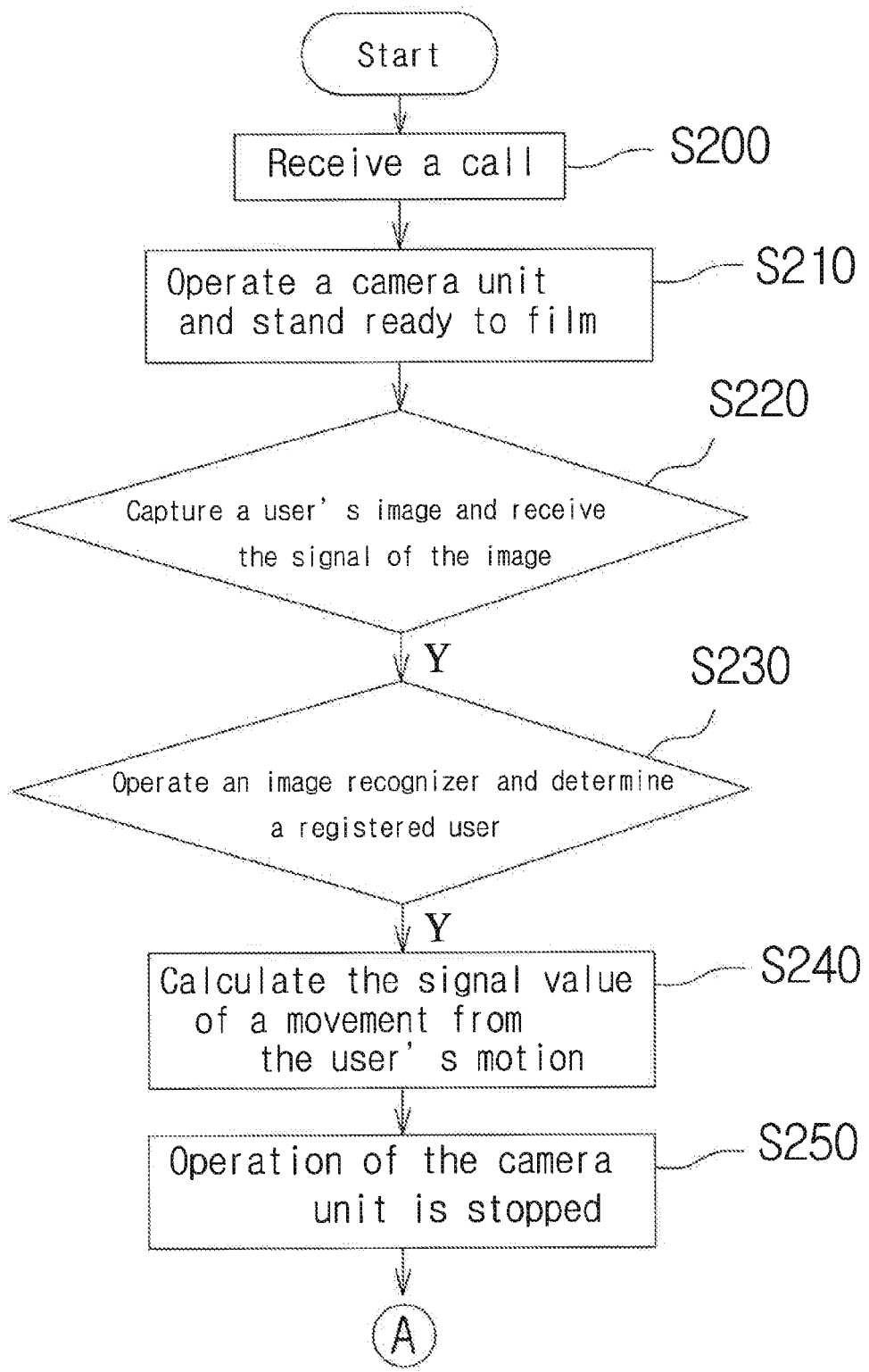
FIG. 2 is a flow chart showing an operation procedure of an apparatus according to the present invention.
Figure 2B:
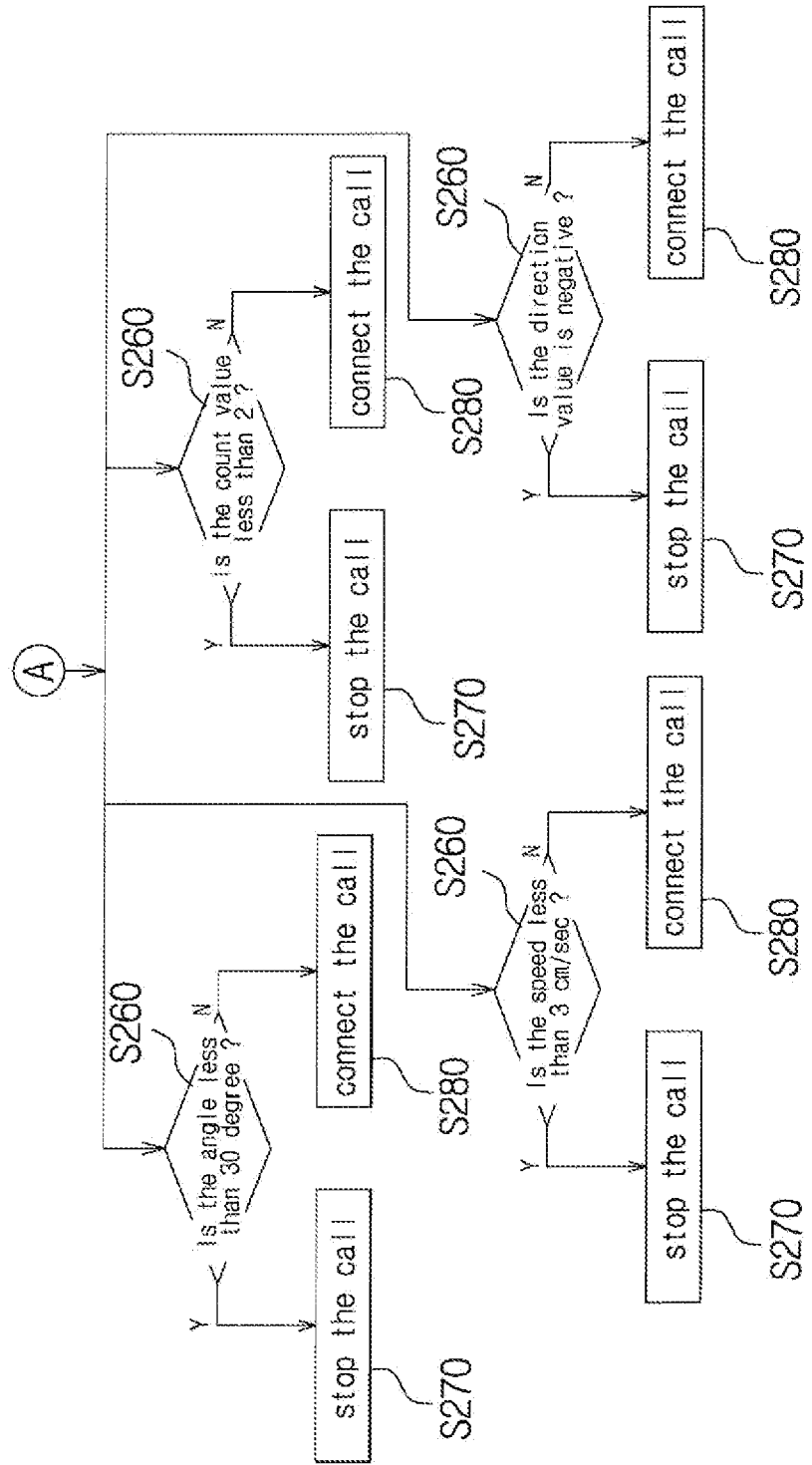

As shown FIGS. 2A and 2B, when a call is received through the communication module 2 (step 200), the control unit 30 operates the camera unit 20 to stand ready to film an image (step 210). When the camera unit 20 captures the user's image and receives the signal of the image (step 220), the control unit 30 operates the image recognizer 32 so that the filmed digital image signal is compared with the user' image filmed and stored previously, and determines whether they are matched (step 230).

If they are matched, the control unit 30 operates the motion signal detector 22 to calculate and detect the angle, the speed, the count or the direction signal of the user's motion from the digital image signal (step 240). After the operation of the camera unit 20 is stopped by the control unit 30 (step 250), the table corresponding to the value of the detected signal is loaded from the module/control table 31 set and stored previously (step 260). Then, the operation, control signal corresponding to the loaded table is outputted so that the communication module 2 stops the call (step 270) or connects the call (step 280).

As described above, according to the present invention, when a call is received through the communication module 2, the control unit 30 outputs an operation signal to the camera unit 20. When the user's motion detecting signal is inputted from the camera unit 20, the control signal corresponding to a user's motion from a motion/control table set and stored previously is outputted. According to the control signal, the call is stopped or connected.

In this case, the control unit 30 converts the user's image signal filmed and inputted previously by the camera 20 to a digital signal, and stores it. The image recognizer 32 compares the stored signal with the user's image signal which is filmed and inputted automatically after receiving the call, and determines whether the user of the filmed image is the registered user of the mobile communication terminal 1.

The motion signal detector 22 extracts an angle signal, a speed signal, a count signal or a direction signal of user's motion from the digital image signal provided by the CPU 21 of the camera unit 20, and outputs the signal to the control unit 30. The control unit 30 outputs an operation control signal to corresponding to the signal extracted and inputted from the motion/control table 31. The specifics related to this operation are same as that of the above described embodiment, so that the detailed explanation thereabout is omitted here.

The call connecting apparatus according to the present invention can connect to a call only if the user is the registered user, before stopping or connecting the call, so that the user's privacy is guaranteed and the communication security is improved.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A call connecting apparatus of a mobile communication terminal for connecting a call with motion information of a user when receiving a call, the apparatus comprising:
   a communication module provided to the mobile communication terminal, wherein the communication module transmits and receives a communication signal;
   a camera unit provided to the mobile communication terminal, wherein the camera unit collects images of the user's shaking or turning motion, converts the images to digital image signals, and outputs an angle signal or a speed signal; and
   a control unit which outputs an operation signal to the camera unit when the communication module receives a call so that the camera unit automatically films the user's shaking or turning motion upon receipt of the call, and which outputs a control signal corresponding to the user's shaking or turning motion when a signal connected with the user's shaking or turning motion automatically filmed is inputted from the camera unit, thereby stopping or connecting the call,
   wherein the camera unit includes a motion signal detector which extracts the angle signal or the speed signal from the digital image signals,
   wherein the control unit includes an image recognizer which compares the signal inputted from the camera unit with a reference signal previously stored in the control unit and determines whether the user is a registered user of the mobile communication terminal based on a comparison result,
   wherein the control unit operates the motion signal detector to calculate and detect an angle or speed of the user's shaking or turning motion when the image recognizer determines the user is the registered user of the mobile communication terminal,
   wherein the control unit stops the call if the angle of the user's shaking or turning motion is less than 30 degree while connecting the call if the angle is equal to or more than 30 degree but less than 90 degree, in case that the motion signal detector extracts the angle signal from the digital image signals, wherein the control unit stops the call if the speed of the user's shaking or turning motion is less than 3 centimeter per second (cm/sec) while connecting the call if the speed is equal to or more than 3 cm/sec, in case that the motion signal detector extracts the speed signal from the digital image signals.

* * * * *